June 16, 1964  R. O. STROMBERG  3,137,369
HYDRAULIC BRAKE FOR AUTOMOTIVE VEHICLES
Filed Sept. 29, 1961  3 Sheets-Sheet 1
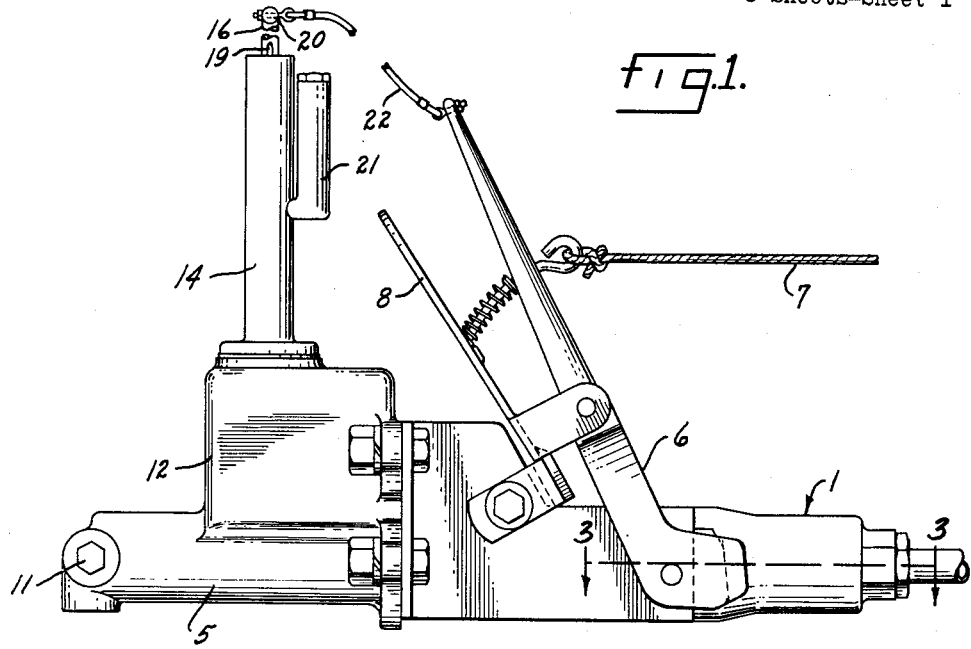
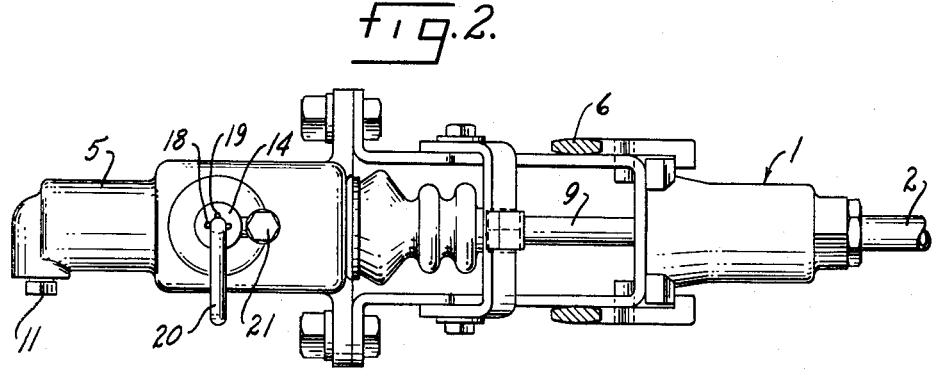
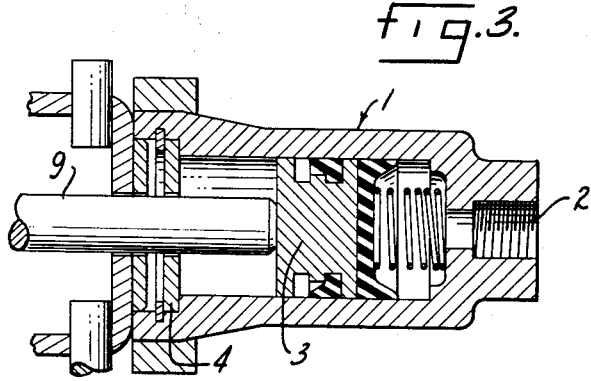
INVENTOR.
Ralph O. Stromberg,
BY Parker & Carter
Attorneys.

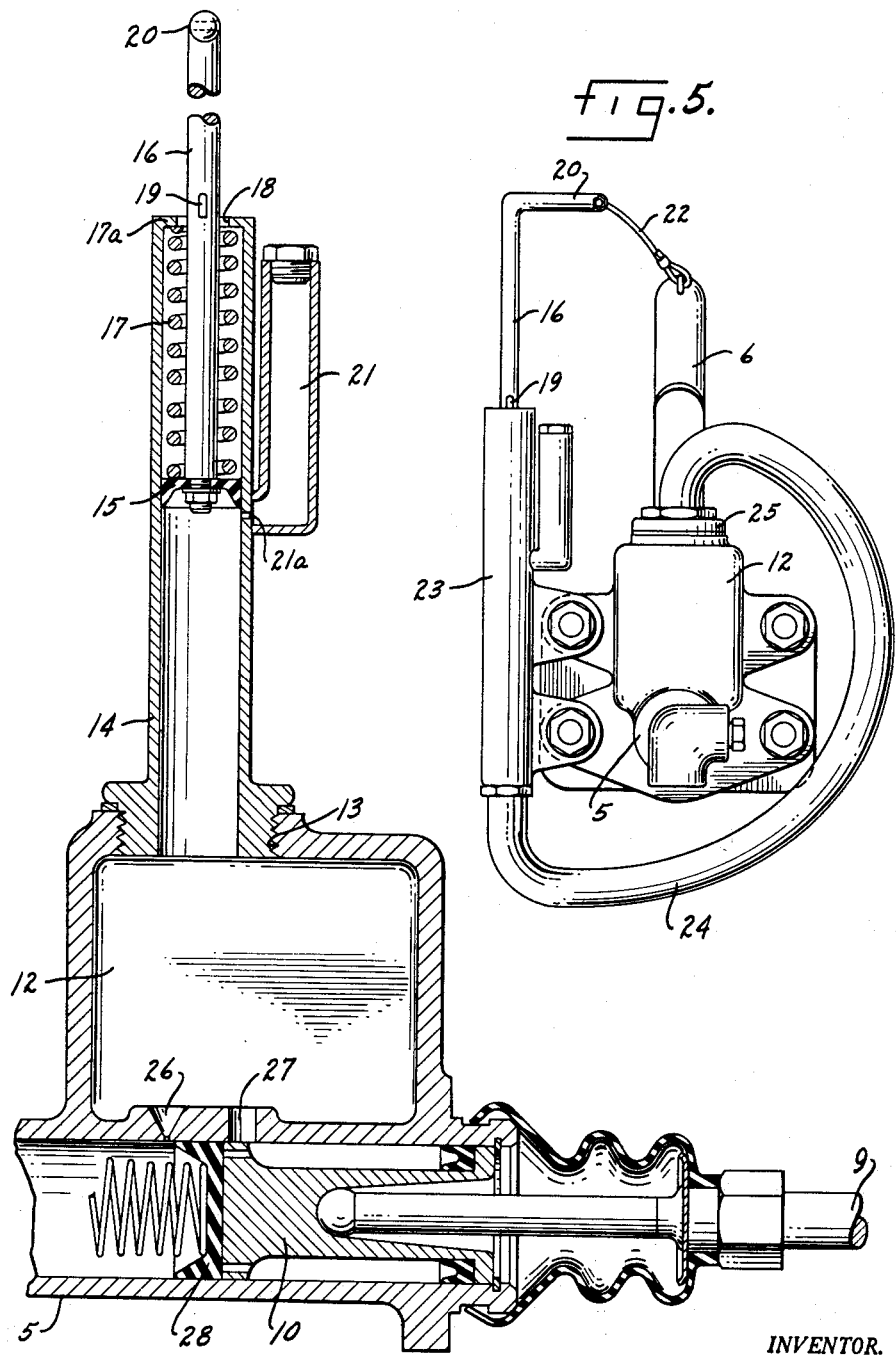

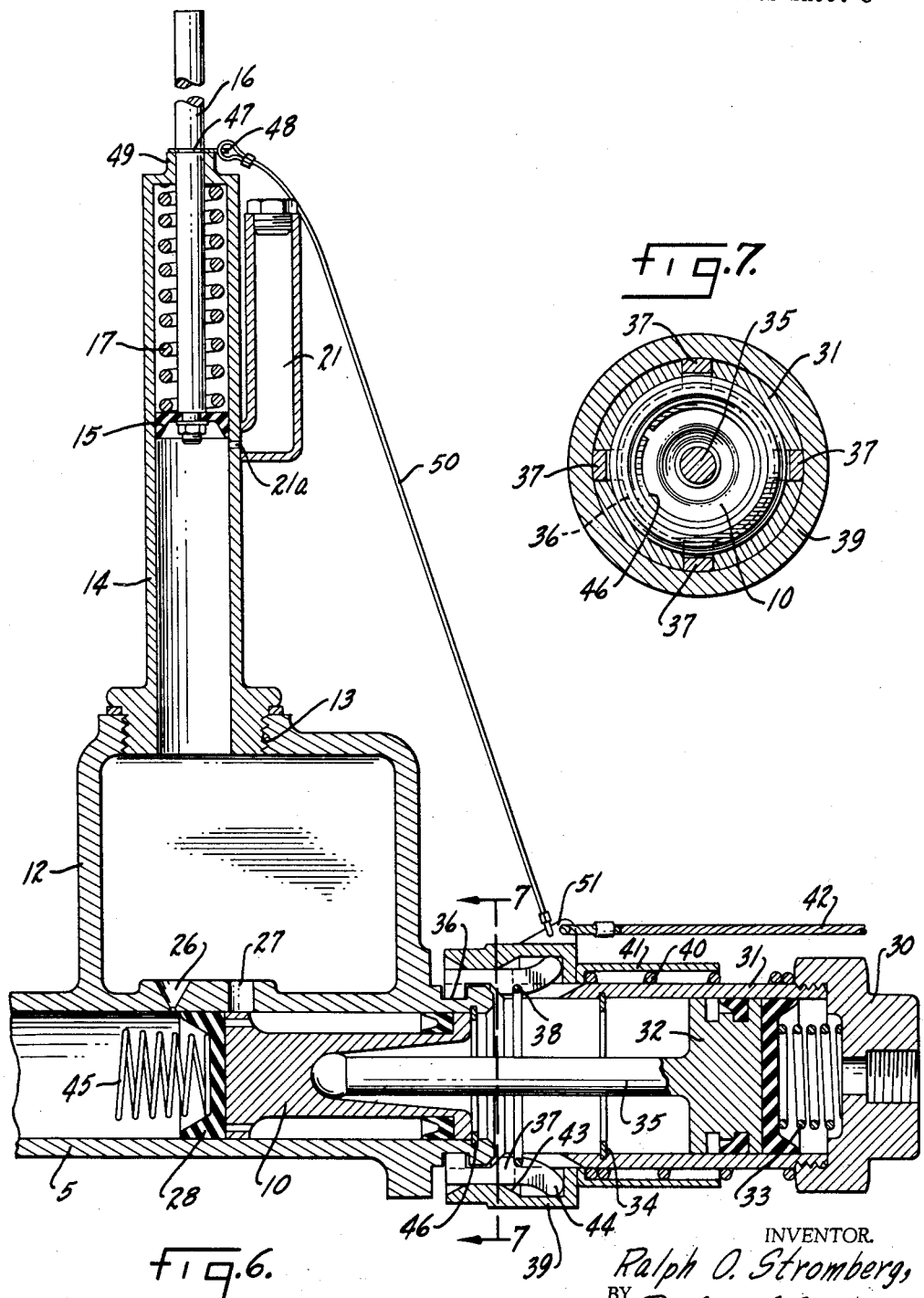

United States Patent Office 3,137,369
Patented June 16, 1964

3,137,369
HYDRAULIC BRAKE FOR AUTOMOTIVE VEHICLES
Ralph O. Stromberg, Chicago, Ill., assignor to Stromberg Hydraulic Brake & Coupling Co., Chicago, Ill., a corporation of Illinois
Filed Sept. 29, 1961, Ser. No. 145,527
4 Claims. (Cl. 188—112)

My invention relates to improvements in hydraulic brake systems for automotive vehicles and is an improvement on and addition to Stromberg Patent No. 2,704,585, issued March 22, 1955 and is a continuation in part of my co-pending application Serial No. 55,542 filed September 12, 1960 now abandoned for Hydraulic Brake Systems for Automotive Vehicles.

In general, my invention relates to the means for automatically applying the trailer brake of a trailer tractor combination when the trailer brake system is intentionally or by accident disconnected from the tractor brake system. My brake applying means may also be used as an auxiliary application means for the hydraulic brake system of an automotive vehicle.

Other objects will appear from time to time throughout the specification and claims.

My invention is illustrated diagrammatically in the accompanying drawings, wherein—

FIGURE 1 is a side elevation of my device in working position;

FIGURE 2 is a plan view with parts in section of FIGURE 1;

FIGURE 3 is a section on an enlarged scale along the line 3—3 of FIGURE 1 through a part of the apparatus;

FIGURE 4 is a vertical section on an enlarged scale of the device of FIGURE 1;

FIGURE 5 is an end elevation of a modified form of the device;

FIGURE 6 is a side elevation of a modified form;

FIGURE 7 is a section along the line 7—7 of FIGURE 6.

Like parts are indicated by like characters throughout the specification and drawings.

The slave cylinder 1 is connected to the hydraulic brake system of the tractor by the duct 2. It contains a plunger 3, with the usual packing. The end of the cylinder is closed by a perforate washer 4 and the cylinder is adapted to be clamped removably on the trailer master cylinder 5 by lock lever 6 which may be released when tension is applied by the safety cord 7 rotating the latch lever 8 to release the lock lever so that the slave cylinder may escape.

A pressure stem 9 extends out from the master cylinder 5, through the washer 4 and abuts against the plunger 3 so that application of pressure on the hydraulic tractor brake system moves the plunger 3 to the left and displaces the master plunger 10 in the master cylinder to exert a pressure on the trailer hydraulic brake system through the duct 11.

Associated with the master cylinder 5 is a hydraulic fluid reservoir 12 ported as at 13 for the usual filler cap.

Screwed into this port and open to the master cylinder is a sleeve 14. An auxiliary plunger 15 is slidable in the sleeve, being mounted on the pin 16 which is encircled by the spring 17 which abuts on the flange 17a at the upper end of the sleeve 14. The flange 17a is slotted at 18 to permit passage of the stop lugs 19 so that when the lugs are in line with the slots, the spring may push the auxiliary plunger down to apply pressure on the fluid contents of the hydraulic fluid reservoir. The handle 20 on the end of the pin 16 may be manipulated to rotate the pin into the released position or to rotate it in such wise that the lugs do not mesh with the end of the cylinder.

The handle 20 may be used to retract the plunger against the spring 17 after brake application.

The auxiliary fluid reservoir 21 is ported at 21a in communication with the inside of the sleeve 14 below the normal inactive position of the plunger and the reservoir is open to atmosphere.

In operation, the plunger is held in the upper position by the lugs 19 engaging the unslotted portion of the flange 17a. There is a direct communication between the auxiliary fluid reservoir 21 through the sleeve to the main hydraulic reservoir 12, the system being thus filled with hydraulic fluid. As the contents of the sleeve and the main hydraulic fluid reservoir expand and contract, the fluid level in the auxiliary reservoir rises and falls but there is no opportunity for air to enter the system and no fluid is lost. The system is thus a closed hydraulic system between the auxiliary plunger 15 and the master plunger 10.

A cord or cable 22 extends from the end of the handle 20 to the lock lever 6 so that when the lock lever 6 is released and moves to the right in FIGURE 1 to permit the escape of the slave cylinder 1, the pin 16 is rotated to bring the stop lugs into line with the slots and permit the spring 17 to apply pressure to the hydraulic brake system on the tractor through the main hydraulic fluid reservoir.

In the past, it has been standard practice to maintain the hydraulic fluid reservoir 12 at atmospheric pressure and exposed at all times to the atmosphere, the hydraulic fluid reservoir always containing air above the liquid and no matter what the brake operation conditions were there would not be in the hydraulic fluid reservoir, pressure above atmospheric.

What I propose is to fill the hydraulic fluid reservoir, keep it filled and maintain it normally under atmospheric pressure, allowing expansion and contraction to change the level of the liquid in the auxiliary fluid reservoir but the instant the auxiliary spring is released, the auxiliary plunger closes the connection to the auxiliary reservoir and applies pressure through the main hydraulic fluid reservoir to the system.

In the modified form of FIGURE 5, I have illustrated an application not to a trailer system but to an automotive vehicle itself. In this case, the auxiliary cylinder 23 is supported at one side of the main reservoir. It has the same plunger spring, thrust rod arrangement together with the auxiliary fluid lever but is connected by duct 24 to the filler cap 25 so that it may be placed inside the body of the tractor or other automotive vehicle may be used as a separate parking brake or as an emergency brake controlled by the passenger so that pressure may be applied to the system independent of and auxiliary to the usual foot pressure in the usual conventional system.

The communication between the main hydraulic fluid reservoir 12 and the master cylinder 5 takes the form of two ports 26 and 27. Thus no matter what the position of the master plunger, there is direct communication between some part of the main cylinder and the reservoir. If the main plunger is in its normal inoperative position, the ports will be one on each side of the plunger and since the plunger has the usual one way packing 28 when pressure is applied to the hydraulic fluid in the main reservoir, that pressure is transmitted through the port 26 direct to the master cylinder in front of the plunger and through the larger port 27 past the packing 28. Thus in every case build up of above atmospheric pressure in the reservoir will, no matter what the position of the master plunger, exert a pressure in the automotive hydraulic brake system whether on the tractor or on the trailer.

Because the auxiliary cylinder may be small in connection with the diameter of the master cylinder and may provide for a much longer travel of the plunger than the travel of the plunger in the master cylinder, a very light spring pressure is sufficient to obtain the necessary pressure build up in the brake system.

In the modified form of FIGURES 6 and 7, I have shown a slightly different hook up between the master cylinder and the slave cylinder and a slightly different form of slave cylinder. This arrangement results in a more compact, lighter and cheaper assembly. The operation, however, to all intents and purposes is the same.

In this case the slave cylinder includes a hub 30 threaded to receive the duct 2, threaded also to receive the slave cylinder body 31 in which reciprocates a piston 32 with usual packing and spring 33 biasing the piston in the outward position toward the snap ring 34. The piston 32 carries a piston rod 35 which engages the master piston 10. The master cylinder is grooved as at 36 to engage a multiplicity of pivoted latch members 37, all rotatably mounted on the pivot ring 38 about the outer end of the cylinder 31. This assembly of latch members is contained within the sliding collar 39, which collar is urged toward the outer end of the cylinder by spring 40 in slidable housing 41. In the position shown in FIGURE 6, the inner cylindrical portion of the collar 39 locks the latch members 37 into the groove 36 and holds the master cylinder and the slave cylinder in direct contact end to end in alignment so that their open ends are in register. Under these circumstances, pressure on the piston 32 is transmitted directly through the piston rod 35 to the master piston 10. When tension is applied to the cable 42 it moves the collar or sleeve 39 to the right back away from the open end of the cylinder 31 and the cam surface 43 engages the curved ends 44 of the latch fingers 37 and release the two cylinders.

When this happens, the normal pressure in the tractor vehicle moves the piston 32 to the left against the snap ring 34, thus no further loss in volume in the tractor system can occur. At the same time the spring 45 urges the master piston 10 to the left against the snap ring 46 so no further change in volume in the hydraulic system on the trailer can occur.

The stem 16 in the modified form is grooved at 47 and a horseshoe shaped keeper 48 engages the groove and rests against the neck 49 at the upper end of the auxiliary cylinder 14. A cable 50 extends from the keeper 48 to the lug 51 on the collar or ring 39 so that after tension on the cable 42 has displaced the ring 39 to release the slave cylinder, tension is applied to the cable 50 to release the horseshoe keeper and allow the spring 17 to apply braking pressure on the trailer.

I claim:

1. In a hydraulic automotive brake system, an open-ended master cylinder, a master piston therein, an open-ended slave cylinder, a slave piston therein, the cylinders being concentric, their open ends being opposed to, in contact with, and registering with each other, a piston rod interposed between the pistons and means for removably locking the two cylinders together, a main hydraulic fluid reservoir in unobstructed communication with the master cylinder, an auxiliary pressure cylinder in unobstructed communication with the reservoir, a plunger in the auxiliary cylinder, and releasable means for biasing the plunger to apply hydraulic pressure from the auxiliary cylinder, through the reservoir and the master cylinder to the brake system, independent of operation of the master plunger, means for releasing the cylinder locking means and for thereafter releasing the auxiliary plunger biasing means.

2. In a tractor trailer automotive brake system, a slave cylinder connected to the tractor system, a master cylinder carried by the trailer connected to the trailer system, a master piston in the master cylinder, a slave piston in the slave cylinder and a driving connection between them, releasable means for holding the cylinders and driving connection in working relationship with one another, a hydraulic fluid reservoir in unobstructed communication with the master cylinder, means for applying pressure to the contents of the fluid reservoir to apply brake pressure to the trailer system responsive to the release of the means for holding the pistons and driving elements in working relation.

3. In a tractor trailer automotive brake system, a slave cylinder connected to the tractor system, a master cylinder carried by the trailer connected to the trailer system, a master piston in the master cylinder, a slave piston in the slave cylinder and a driving connection between them, releasable means for holding the cylinders and driving connection in working relationship with one another, a hydraulic fluid reservoir in unobstructed communication with the master cylinder, means for applying pressure to the contents of the fluid reservoir to apply brake pressure to the trailer system responsive to the release of the means for holding the pistons and driving elements in working relation including a cylinder, connected to the reservoir, a plunger in the cylinder, pressure means adapted to urge the plunger toward the reservoir, a releasable latch adapted to hold the plunger against movement, means responsive to release of the means for holding the pistons and driving elements in working relation for releasing the latch to permit the plunger to be moved to exert pressure on the contents of the fluid reservoir to apply brake pressure to the trailer system.

4. In a hydraulic automotive brake system, an open-ended master cylinder, a master piston therein, an open-ended slave cylinder, a slave piston therein, the cylinders being concentric, their open ends being opposed to, in contact with, and registering with each other, a piston rod interposed between the pistons and means for removably locking the two cylinders together, a main hydraulic fluid reservoir in unobstructed communication with the master cylinder, the cylinder locking means including a latch member interposed between the two cylinders, a latch actuating member slidably mounted on one of them adapted normally to hold the latch in locking position and adapted when moved away from the locking position to cam the latch into releasing position, means for applying pressure to the contents of the fluid reservoir to apply brake pressure to the trailer system, responsive to the release of the cylinder locking means.

References Cited in the file of this patent
UNITED STATES PATENTS

| | | |
|---|---|---|
| 2,058,063 | Cox | Oct. 20, 1936 |
| 2,184,042 | Harrington | Dec. 19, 1939 |
| 2,217,827 | Wilkerson | Oct. 15, 1940 |
| 2,299,932 | Scott | Oct. 27, 1942 |
| 2,325,846 | Forbes | Aug. 3, 1943 |
| 2,848,074 | Puddy | Aug. 19, 1958 |